United States Patent
Zhu

(10) Patent No.: US 11,323,210 B2
(45) Date of Patent: May 3, 2022

(54) METHOD AND DEVICE FOR TRANSMITTING HYBRID AUTOMATIC REPEAT REQUEST INFORMATION

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 4 days.

(21) Appl. No.: 16/958,532

(22) PCT Filed: Dec. 28, 2017

(86) PCT No.: PCT/CN2017/119249
§ 371 (c)(1),
(2) Date: Jun. 26, 2020

(87) PCT Pub. No.: WO2019/127183
PCT Pub. Date: Jul. 4, 2019

(65) Prior Publication Data
US 2021/0006364 A1   Jan. 7, 2021

(51) Int. Cl.
*H04W 76/27* (2018.01)
*H04L 1/18* (2006.01)
(Continued)

(52) U.S. Cl.
CPC ............ *H04L 1/1819* (2013.01); *H04L 5/10* (2013.01); *H04W 24/08* (2013.01);
(Continued)

(58) Field of Classification Search
CPC ... H04W 76/27; H04W 24/08; H04W 72/042; H04W 72/0446; H04W 80/02; H04L 1/1819; H04L 5/10
See application file for complete search history.

(56) References Cited

U.S. PATENT DOCUMENTS

| 2015/0365198 A1 | 12/2015 | Tabet et al. |
| 2016/0087761 A1 | 3/2016 | Fei |

(Continued)

FOREIGN PATENT DOCUMENTS

| CN | 102684855 A | 9/2012 |
| CN | 103580831 A | 2/2014 |

(Continued)

OTHER PUBLICATIONS

Extended European Search Report dated Dec. 2, 2020 in corresponding European Patent Application No. 17936685.1, 8 pages.
(Continued)

*Primary Examiner* — Wei Zhao
(74) *Attorney, Agent, or Firm* — Oblon, McClelland, Maier & Neustadt, L.L.P.

(57) ABSTRACT

The present disclosure provides a method and device for transmitting hybrid automatic repeat request (HARQ) information. The method can include monitoring a channel bearing the HARQ information on a target time domain unit, demodulating, on the basis of a HARQ network temporary identity notified by a base station, downlink control information borne by the channel in response to determining that a channel is monitored, and acquiring the HARQ information from a specified information field of the downlink control information.

19 Claims, 10 Drawing Sheets

(51) Int. Cl.
  *H04L 5/10* (2006.01)
  *H04W 24/08* (2009.01)
  *H04W 72/04* (2009.01)
  *H04W 80/02* (2009.01)

(52) U.S. Cl.
  CPC ..... *H04W 72/042* (2013.01); *H04W 72/0446* (2013.01); *H04W 76/27* (2018.02); *H04W 80/02* (2013.01)

(56) References Cited

U.S. PATENT DOCUMENTS

2016/0198453 A1    7/2016   Hu et al.
2017/0331577 A1*  11/2017   Parkvall ............... H04B 7/0848
2017/0332358 A1*  11/2017   Park ................. H04W 72/1289
2019/0342037 A1*  11/2019   Karaki ................. H04L 1/1854

FOREIGN PATENT DOCUMENTS

| CN | 104184564 A | 12/2014 |
| CN | 104243109 A | 12/2014 |
| CN | 104365051 A | 2/2015 |
| CN | 104601305 A | 5/2015 |
| CN | 105191196 A | 12/2015 |
| CN | 105634689 A | 6/2016 |
| CN | 106330410 A | 1/2017 |
| CN | 106559188 A | 4/2017 |
| CN | 106571897 A | 4/2017 |
| CN | 107027180 A | 8/2017 |
| CN | 107113122 A | 8/2017 |
| WO | WO 2014/005284 A1 | 1/2014 |

OTHER PUBLICATIONS

Samsung: "HARO-ACK for PUSCH", 3GPP Draft; R1-156745 Pusch Haro, 3RD Generation Partnership Project (3GPP), vol. RAN WG1, No. Anaheim, XP051003125, Nov. 15, 2015, 2 pages Retrieved from the Internet: URL:http://www.3gpp.org/ftp/Meetings_3GPP_SYNC/RAN1/Docs/ [retrieved on Nov. 15, 2015].
International Search Report dated Aug. 30, 2018 in PCT/CN2017/119249 filed on Dec. 28, 2017, 2 pages.
Combined Chinese Office Action and Search Report dated May 18, 2021 in corresponding Chinese Patent Application No. 201780002377.2 (with English Translation), 13 pages.

* cited by examiner

METHOD AND DEVICE FOR TRANSMITTING HYBRID AUTOMATIC REPEAT REQUEST INFORMATION

CROSS-REFERENCE

This application is a national phase application under 35 U.S.C. § 371 of International Patent Application No. PCT/CN2017/119249, filed on Dec. 28, 2017.

TECHNICAL FIELD

The present disclosure relates to the field of communication technology, and in particular, to a method and device for transmitting hybrid automatic repeat request information.

BACKGROUND

In a radio communication system, due to time-varying characteristics of a radio channel and influence of multipath fading, data transmission between user equipment and a base station may fail. In view of this matter, a Hybrid Automatic Repeat reQuest (HARQ) mechanism is introduced. A data sending end may determine whether to retransmit the data based on HARQ feedback information fed back by a data receiving end.

In the related art, there is a regular relationship between data transmission time and transmission time of the HARQ feedback information. For example, in a Long Term Evolution (LTE) system, limited by processing power of the user equipment, an interval between the data transmission time and the transmission time of the HARQ feedback information is at least 4 ms, which increases delay in retransmitting data to some extent. In order to meet requirements of high reliability and low delay for some services in the 5th Generation (5G), a new HARQ feedback mechanism needs to be proposed to solve the problem in the art of long data transmission delay caused by regular HARQ feedback.

SUMMARY

Exemplary embodiments of the present disclosure provide a method and device for transmitting hybrid automatic repeat request (HARQ) information, through which user equipment is scheduled by a base station to send or receive HARQ feedback information on a specified time domain unit, and reduce long data transmission delay caused by regular HARQ feedback.

A first aspect of an embodiment of the present disclosure provides a method for transmitting hybrid automatic repeat request information (HARQ) that is applied to user equipment. The method can include monitoring, on a target time domain unit, a channel bearing HARQ information, in response to determining that the channel is monitored, demodulating, on the basis of a HARQ network temporary identity notified by a base station, downlink control information borne by the channel, and acquiring the HARQ information from a specified information field of the downlink control information.

In an embodiment, the method can further include receiving, through a RRC signaling, the HARQ network temporary identity sent by the base station, receiving, through a MAC control element (CE), the HARQ network temporary identity sent by the base station, or receiving, through a physical layer signaling, the HARQ network temporary identity sent by the base station. In an embodiment, the channel is a physical downlink control channel, or a dedicated HARQ channel.

In an exemplary embodiment, the method can further include receiving a scheduling signaling sent by the base station, where the scheduling signaling bears the target time domain unit.

When the channel is the dedicated HARQ channel, before being scheduled by the base station to send the target time domain unit for receiving the HARQ information, the method further can further include receiving the RRC signaling, or the MAC CE, or the physical layer signaling sent by the base station, and determining a location set of the target time domain unit based on the RRC signaling, or the MAC CE, or the physical layer signaling.

In an embodiment, when the channel bears the HARQ information corresponding to uplink data sent by the user equipment on more than two uplink time domain units, acquiring the HARQ information from the specified information field of the downlink control information, can include acquiring the HARQ information for the uplink data transmitted on a corresponding uplink time domain unit from different information fields, based on a first correspondence between different information fields of the downlink control information and different uplink time domain units.

In an embodiment, the first correspondence is determined based on a mapping rule predefined by a system; or, the first correspondence is determined based on the RRC signaling, or the MAC CE, or the physical layer signaling sent by the base station.

Further, when the channel bears the HARQ information corresponding to the uplink data sent by more than two user equipment, acquiring the HARQ information from the specified information field of the downlink control information, can include acquiring the HARQ information corresponding to the sent uplink data from a corresponding information field, based on a second correspondence between different information fields of the downlink control information and different user equipment. In an embodiment, the second correspondence is determined based on the RRC signaling, or the MAC CE, or the physical layer signaling sent by the base station.

A second aspect of the present disclosure provides a method for transmitting HARQ information that is applied to a base station. The method can include receiving uplink data sent by user equipment, sending, to the user equipment, a target time domain unit where the user equipment is notified to receive HARQ information, and sending the HARQ information on the target time domain unit.

In an embodiment, sending, to the user equipment, a target time domain unit where the user equipment is notified to receive the HARQ information, can include sending the target time domain unit through a scheduling signaling.

When a channel bearing the HARQ information is a dedicated HARQ channel, before sending the target time domain unit through a scheduling signaling, the method can further include sending, through a RRC signaling, or a MAC CE, or a physical layer signaling, a location parameter for determining a location set of the target time domain unit.

In an embodiment, the method can further include sending a HARQ network temporary identity to the user equipment through the RRC signaling, sending the HARQ network temporary identity to the user equipment through the MAC CE, or sending the HARQ network temporary identity to the user equipment through the physical layer signaling.

A third aspect of the present disclosure provides a device for transmitting HARQ information that is applied to user equipment. The device can include a monitoring module that is configured to: monitor, on a target time domain unit, a channel bearing the HARQ information, and a demodulating module that is configured to, in response to determining that the channel is monitored, demodulate, on the basis of a HARQ network temporary identity notified by a base station, downlink control information borne by the channel. The device can further include an acquiring module that is configured to acquire the HARQ information from a specified information field of the downlink control information.

In an embodiment, the device further includes a first receiving module that is configured to receive the HARQ network temporary identity sent, through a RRC signaling, by the base station, receive the HARQ network temporary identity sent, through a MAC CE, by the base station; or receive the HARQ network temporary identity sent, through a physical layer signaling, by the base station.

In an embodiment, the channel is a physical downlink control channel, or a dedicated HARQ channel.

In an embodiment, the device can further include a second receiving module that is configured to receive a scheduling signaling sent by the base station, where the scheduling signaling bears the target time domain unit.

When the channel is the dedicated HARQ channel, the device can further include third receiving module that is configured to receive the RRC signaling, or the MAC CE, or the physical layer signaling sent by the base station, and determine a location set of the target time domain unit, based on the RRC signaling, or the MAC CE, or the physical layer signaling.

In an embodiment, when the channel bears the HARQ information corresponding to uplink data sent by the user equipment on more than two uplink time domain units, the acquiring module can further includes a first acquiring sub-module that is configured to acquire, on the basis of a first correspondence between different information fields of the downlink control information and different uplink time domain units, the HARQ information for the uplink data transmitted on a corresponding uplink time domain unit from different information fields.

In an embodiment, the first correspondence is determined based on a mapping rule predefined by a system; or, the first correspondence is determined based on the RRC signaling, or the MAC CE, or the physical layer signaling sent by the base station.

In an embodiment, when the channel bears the HARQ information corresponding to the uplink data sent by more than two user equipment, the acquiring module can further include a second acquiring sub-module that is configured to acquire, on the basis of a second correspondence between different information fields of the downlink control information and different user equipment, the HARQ information corresponding to the sent uplink data from a corresponding information field.

In an embodiment, the second correspondence is determined based on the RRC signaling, or the MAC CE, or the physical layer signaling sent by the base station.

A fourth aspect of the present disclosure provides a device for transmitting HARQ information that is applied to a base station. The device can further include a fourth receiving module that is configured to receive uplink data sent by user equipment, a first sending module that is configured to send, to the user equipment, a target time domain unit where the user equipment is notified to receive HARQ information, and a feedback module that is configured to send the HARQ information on the target time domain unit.

In an embodiment, the first sending module is configured to send the target time domain unit through a scheduling signaling.

When a channel bearing the HARQ information is a dedicated. HARQ channel, the device can further include a second sending module, configured to: send, through a RRC signaling, or a MAC CE, or physical layer signaling, a location parameter for determining a location set of the target time domain unit.

In an embodiment, the device can further includes a third sending module that is configured to send, to the user equipment, a HARQ network temporary identity through the RRC signaling, send, to the user equipment, the HARQ network temporary identity through the MAC CE, or send, to the user equipment, the HARQ network temporary identity through the physical layer signaling.

A fifth aspect of the present disclosure provides user equipment including a processor, and a memory for storing processor executable instructions. The processor can be configured to monitor, on a target time domain unit, a channel bearing HARQ information, in response to determining that the channel is monitored, demodulate, on the basis of a HARQ network temporary identity notified by a base station, downlink control information borne by the channel, and acquire the HARQ information from a specified information field of the downlink control information.

A sixth aspect of the embodiments of the present disclosure provides a base station including a processor, and a memory for storing processor executable instructions. The processor can be configured to receive uplink data sent by user equipment, send, to the user equipment, a target time domain unit where the user equipment is notified to receive HARQ information, and send the HARQ information on the target time domain unit.

According to a seventh aspect of the present disclosure, a non-transitory computer-readable storage medium is provided. The storage medium stores computer instructions that, when executed by a processor, cause the processor to implement the following steps of monitoring, on a target time domain unit, a channel bearing HARQ information, and, in response to determining that the channel is monitored, demodulating, on the basis of a HARQ network temporary identity notified by a base station, downlink control information borne by the channel. Further, it can implement acquiring the HARQ information from a specified information field of the downlink control information.

According to an eighth aspect of the present disclosure, a non-transitory computer-readable storage medium is provided. The storage medium stores computer instructions that, when executed by a processor, can cause the processor to implement the following steps of receiving uplink data sent by user equipment, sending, to the user equipment, a target time domain unit where the user equipment is notified to receive HARQ information, and sending the HARQ information on the target time domain unit.

The technical solutions provided by the embodiments of the present disclosure can have beneficial effects. For example, after sending data to a base station, user equipment may monitor, on a target time domain unit, a channel bearing HARQ information, and acquire the HARQ information from a specified information field of downlink control information after the demodulation is successful. Through the above technical solution, the user equipment is scheduled by a base station to send or receive HARQ feedback information on a specified time domain unit, thereby reducing long data transmission delay caused by regular HARQ feedback.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with the present disclosure, and are used to explain the principles of the present disclosure together with the specification.

DETAILED DESCRIPTION

Figure 1A:
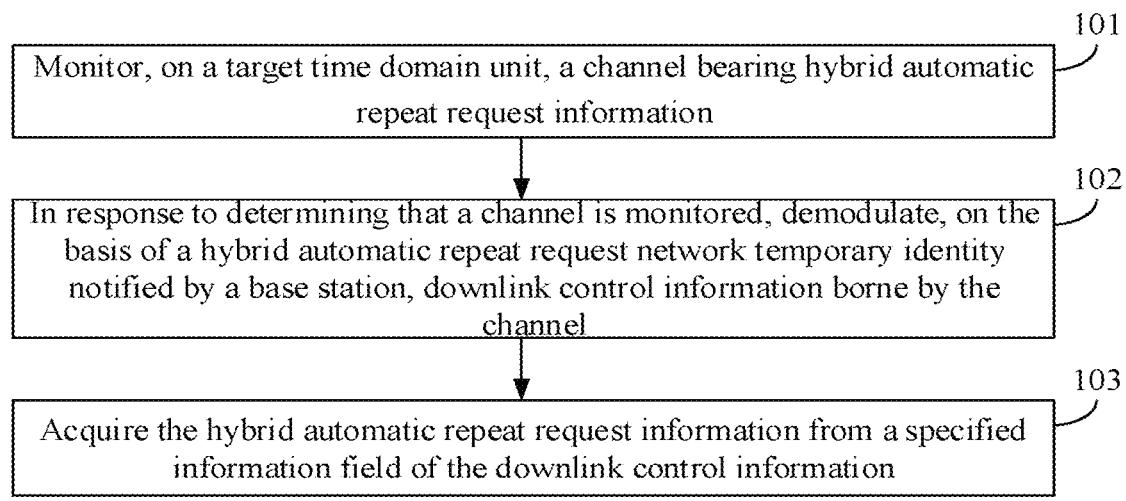
FIG. 1A is a flowchart illustrating a method for transmitting hybrid automatic repeat request information according to an exemplary embodiment.

Exemplary embodiments will be described in detail here, examples of which are shown in the drawings. When the following description refers to the accompanying drawings, unless otherwise indicated, the same numerals in different drawings represent the same or similar elements. The embodiments described in the following exemplary embodiments do not represent all embodiments consistent with the present disclosure. Rather, they are merely examples of devices and methods consistent with some aspects of the disclosure as detailed in the appended claims.

Figure 1B:
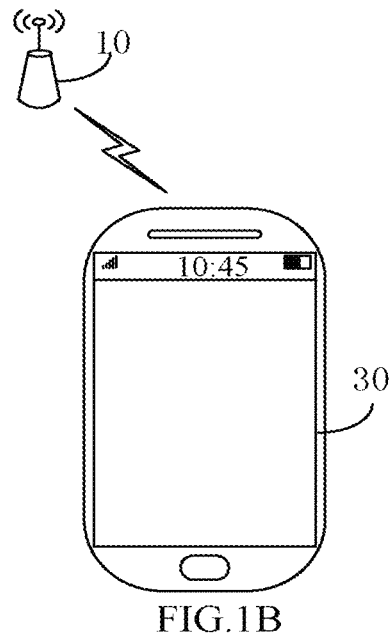
FIG. 1B is a diagram illustrating a scene for a method for transmitting hybrid automatic repeat request information according to an exemplary embodiment.
Figure 1C:
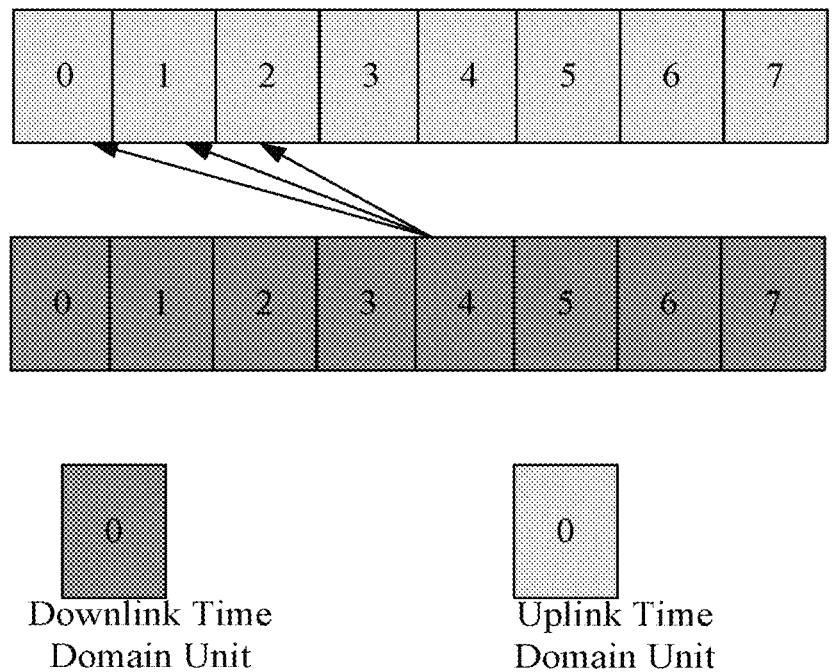
FIG. 1C is a schematic diagram illustrating feedback for HARQ feedback information according to an exemplary embodiment.

FIG. 1A is a flowchart illustrating a method for transmitting hybrid automatic repeat request (HARQ) information according to an exemplary embodiment, FIG. 1B is a diagram illustrating a scene for a method for transmitting HARQ information according to an exemplary embodiment, and FIG. 1C is a schematic diagram illustrating feedback for HARQ feedback information according to an exemplary embodiment. The method for transmitting HARQ information may be applied to user equipment, such as a UE and a base station. As shown in FIG. 1A, the method fir transmitting HARQ information includes steps 101 to 103 described below.

In step 101, a channel bearing HARQ information is monitored on a target time domain unit. In an embodiment, a time domain unit may be a transmission time unit, an orthogonal frequency division multiplexing symbol, a time slot, or may be a logic transmission unit, such as a sub-frame, a radio frame, etc., defined in a communication system. Further, after receiving uplink data sent by the user equipment, the base station may notify, through a scheduling signaling, the target time domain unit where the user equipment monitors the HARQ feedback information. A time interval between the target time domain unit and the time domain unit where the user equipment sends data (that is, a time interval between sending uplink data by the user equipment and feeding the HARQ feedback information back by the base station) may be determined by the base station based on capacity of the user equipment. If processing capability of the user equipment is high, the time interval may be set to be short, such as 1 slot, and if the processing capability of the user equipment is low, the time interval may be set to be long, such as 2 slots.

In an embodiment, the time interval between sending uplink data by the user equipment and feeding the HARQ feedback information back by the base station may be determined by the base station, and a time interval between sending downlink data by the base station and responding to the HARQ feedback information by the user equipment may also be determined by the base station based on the capability of the user equipment.

In an embodiment, the channel bearing the HARQ information may be a Physical Downlink Control Channel (PDCCH). In an embodiment, the channel bearing the HARQ information may be a dedicated HARQ channel. The HARQ channel may be a newly defined channel for bearing HARQ feedback information in a radio communication system.

In step 102, in response to determining that the channel is monitored, downlink control information borne by the channel is demodulated based on a hybrid automatic repeat request network temporary identity notified by a base station. In an embodiment, the user equipment may receive a HARQ Radio Network Tempory Identity (referred to as RNTI) for HARQ feedback information transmission, that is, HARQ-RNTI, notified by the base station through a Radio Resource Control (RRC) signaling. The RRC signaling may be a signaling for multiple users, or may be a signaling dedicated to one user. In an embodiment, the user equipment may receive the HARQ-RNTI sent by the base station through a media access control (MAC) Control Element (referred to as CE). In an embodiment, the user equipment may receive the HARQ-RNTI sent by the base station through a physical layer signaling. In an embodiment, instead of being notified by the base station through a signaling, the HARQ-INTI may also be defined in a protocol by the system.

In an embodiment, the HARQ-RNTI may be directed to one user equipment, that is, the channel scrambled by the HARQ-RNTI bears the HARQ feedback information for one user equipment. In an embodiment, one channel may bear the HARQ feedback information for the uplink data sent by one user equipment on more than one time domain unit. As shown in FIG. 1C, for the uplink data transmitted by the terminal on uplink time domain units 0, 1, and 2, the base station may send the HARQ feedback information on downlink time domain unit 4, while in the related art, there is a regular relationship between the uplink time domain unit where the uplink data is sent and the time domain unit where the HARQ feedback information is sent, so it is impossible for the base station to send, on one downlink time domain unit, the HARQ feedback information corresponding to more than two uplink time domain units. It may be pre-agreed by the system or specified by the base station through a signaling that which one or several information bits in the downlink time domain unit corresponds to HARQ feedback information for which uplink time domain unit.

Further, the HARQ-RNTI may be for multiple user equipment, that is, multiple user equipment obtain a same HARQ-RNTI through a signaling transmitted by the base station or in a pre-defined manner. The downlink control information scrambled by the HARQ-RNTI includes HARQ feedback information for multiple user equipment.

In step 103, the hybrid automatic repeat request information is acquired from a specified information field of the downlink control information. In an embodiment, different information fields of the Downlink Control information (DCI) may indicate HARQ feedback information for uplink data transmitted on different uplink time domain units of one user equipment. In an embodiment, different information fields of the DCI may indicate the HARQ feedback information for uplink data transmitted by different user equipment. In another embodiment, different information fields of DCI may also indicate the HARQ feedback information for uplink data transmitted on multiple transmission units of different user equipment. In an embodiment, the method for acquiring the HARQ information from the specified information field of the downlink control information may be referred to the embodiments shown in FIGS. 2 to 5, which is not described in detail here.

In an exemplary scenario, as shown in FIG. 1B, taking a mobile network as a 5G network and a base station as a gNB as an example for illustration (the technical solution of the present disclosure is not limited to a 5G network, and other network systems may also be used), the scenario shown in FIG. 1B includes a gNB10 and a UE20. When data transmission is performed between the gNB10 and the UE20, for example, after the UE20 sends data to the gNB10, the gNB10 may notify, through a scheduling signaling, the UE20 a specified target time domain unit where the channel is monitored, so as to implement a non-regular HARQ feedback mechanism.

In this embodiment, through the above steps 101-103, after sending data to the base station, the user equipment may monitor, on the target time domain unit notified by the base station, the channel bearing the HARQ information, and acquire the HARQ information from the specified information field of the downlink control information after the DCI is successfully demodulated. Through the above technical solution, the user equipment is scheduled by the base station to send or receive the HARQ feedback information on the specified time domain unit, thereby solving the problem in the art of long data transmission delays caused by regular HARQ feedback.

Technical solutions provided by embodiments of the present disclosure will be described below by taking specific embodiments as examples.

Figure 2:
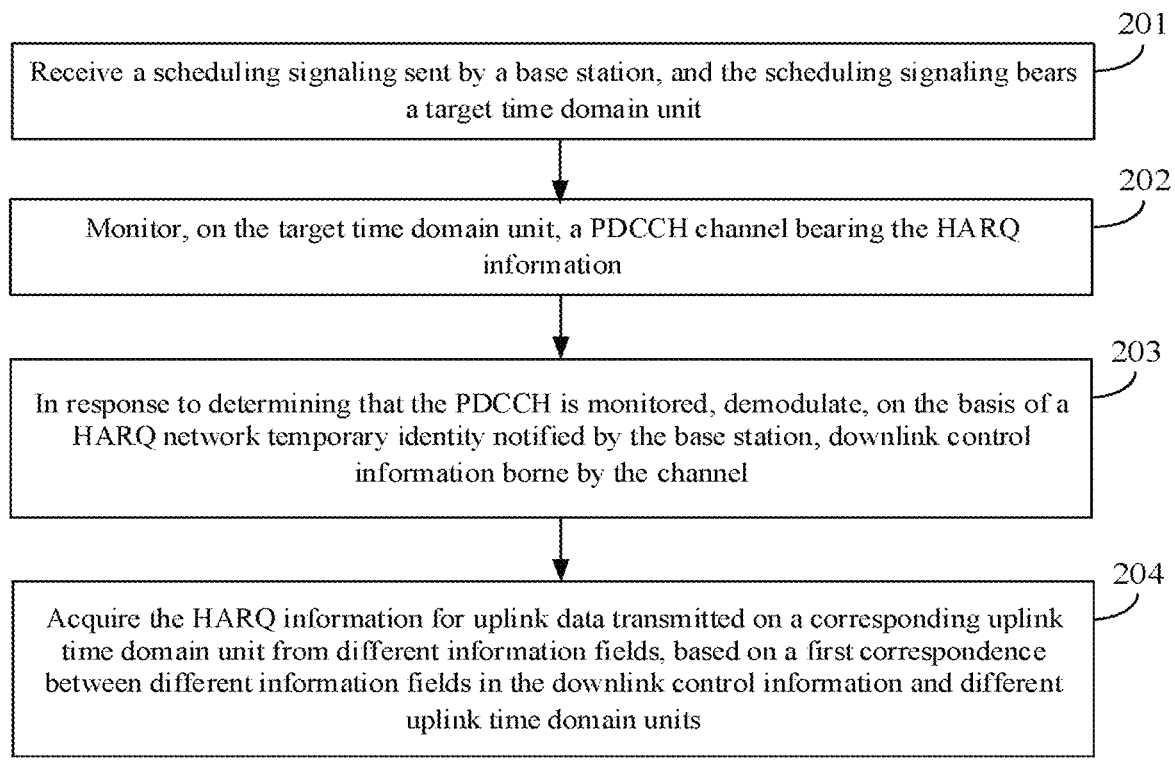
FIG. 2 is a flow chart illustrating another method for transmitting hybrid automatic repeat request information according to an exemplary embodiment.

FIG. 2 is a flow chart illustrating yet another method for transmitting HARQ information according to an exemplary embodiment. This embodiment uses the above method provided by embodiments of the present disclosure to exemplarily illustrate how to acquire, by user equipment, HARQ feedback information sent by a base station through a PDCCH, where the HARQ feedback information corresponds to uplink data transmitted on more than one uplink time domain unit. As shown in FIG. 2, the method includes steps described below.

In step 201, a scheduling signaling sent by a base station is received, and the scheduling signaling bears a target time domain unit. In an embodiment, by sending the scheduling signaling, the base station may notify the user equipment to monitor, on a specified target time domain resource, a Physical Downlink Control Channel (PDCCH) bearing the HARQ feedback information. In an embodiment, the method for notifying the user equipment of the target time domain unit through a scheduling signaling may refer to the prior art, which is not described in detail here.

In step 202, a PDCCH bearing the HARQ feedback information is monitored on the target time domain unit.

In step 203, in response to determining that the PDCCH is monitored, downlink control information borne by the channel is demodulated based on a HARQ network temporary identity notified by the base station. In an embodiment, step 203 may refer to description of step 102 in the embodiment shown in FIG. 1A, which will not be described in detail here.

In step 204, based on a first correspondence between different information fields of the downlink control information and different uplink time domain units, HARQ information for uplink data transmitted on a corresponding uplink time domain unit is acquired from different information fields.

In an embodiment, one PDCCH channel may bear the HARQ feedback information for uplink data sent by one user equipment on more than one time domain unit, and the user equipment may acquire the HARQ information for the uplink data transmitted on the corresponding uplink time domain unit from different information fields, based on the first correspondence between different information fields of DCI information and different uplink time domain units. For example, a first information field (e.g., a first hit of DCI information) bears the HARQ information for the uplink data transmitted on a first group of uplink time domain units, a second information field bears the HARQ information for the uplink data transmitted on a second group of uplink time domain units, and the like.

Further, the first correspondence can be determined based on a predefined mapping rule of the system. For example, the predefined mapping rule indicates that in the DCI information, the HARQ feedback information for the uplink data transmitted on different uplink time domain units is arranged in sequence, then the user equipment may know the HARQ feedback information of the uplink time domain unit to which each information field of the DCI corresponds. In an embodiment, the first correspondence is determined based on a RRC signaling, or a MAC CE, or physical layer signaling sent by the base station, for example, through the RRC signaling, the MAC CE, or the physical layer signaling, the base station notifies that a HARQI10 identity is assigned to a first uplink time domain unit, a HARQID2 identity is assigned to a second uplink time domain unit, and a HARQIDn identity is assigned to a nth uplink time domain unit and so on, then the user may demodulate the information fields in the DCI, the first information field bears the HARQ feedback on the transmission unit assigned with HARQID1, the second information field bears the HARQ feedback on the transmission unit assigned with HARQID2, and a nth information field bears the HARQ feedback on the transmission unit assigned with HARQIDn. Therefore, based on the HARQIDn identity, the user equipment may determine the HARQ feedback information to which the uplink data transmitted on the uplink time domain unit corresponds.

In this embodiment, the base station may bear, on the PDCCH channel, the HARQ information for the uplink data transmitted on multiple uplink time domain units of one user equipment, and the user equipment may acquire the HARQ information for a corresponding uplink time domain unit from the different information fields in the DCI, based on the first correspondence between different information fields and uplink time domain units, so that a new HARQ feedback mechanism is implemented, which solves the problem in the art of long data transmission delay caused by regular HARQ feedback. Further, waste of resources may be reduced by bearing, through one PDCCH channel, the HARQ information for the uplink data transmitted on multiple uplink time domain units of one user equipment.

Figure 3:
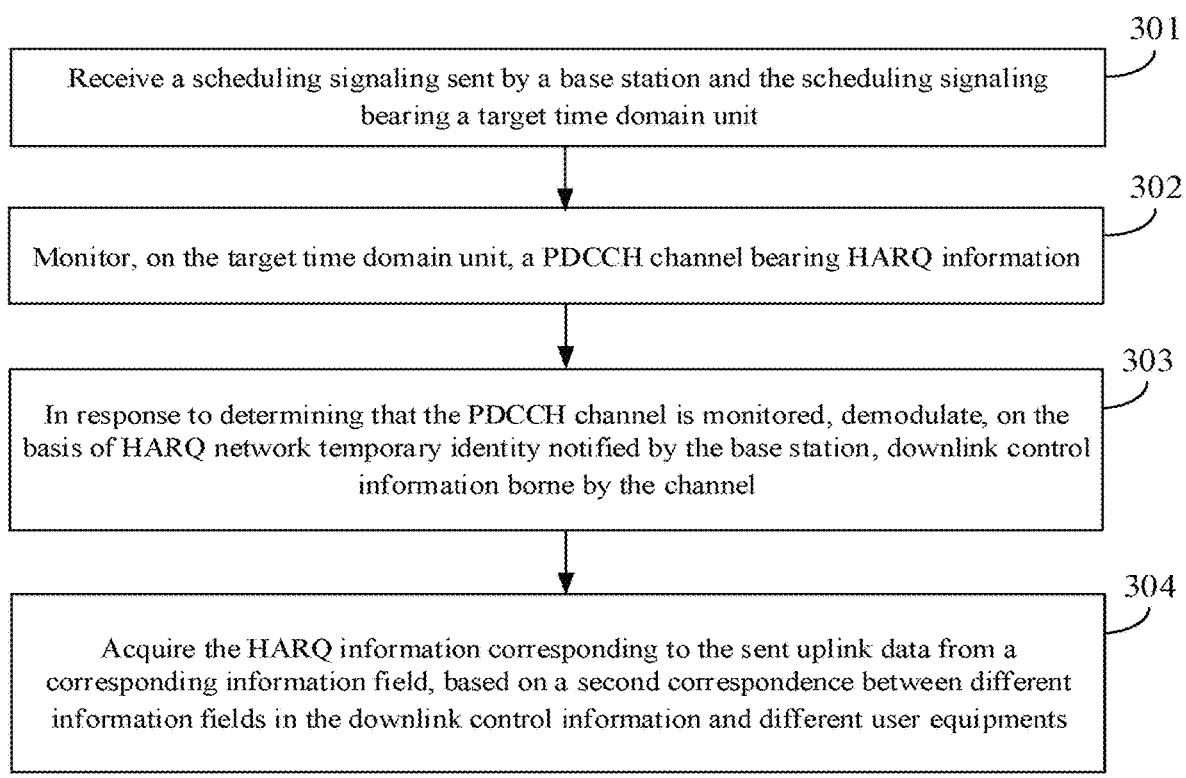
FIG. 3 is a flow chart illustrating yet another method for transmitting hybrid automatic repeat request information according to an exemplary embodiment.

FIG. 3 is a flowchart illustrating yet another method for transmitting HARQ information according to an exemplary embodiment. This embodiment uses the above method provided by the embodiments of the present disclosure to exemplarily illustrate how to acquire, by user equipment, HARQ feedback information for multiple user equipment sent by a base station through a PDCCH channel. As shown in FIG. 3, the method includes steps described below.

In step 301, a scheduling signaling sent by a base station is received, and the scheduling signaling bears a target time domain unit.

In step 302, a PDCCH channel bearing HARQ information is monitored on the target time domain unit.

In an embodiment, for the description of step 301 and step 302, reference may be made to the description of step 201 and step 202 of the embodiment shown in FIG. 2, which is not described in detail here.

In step 303, in response to determining that the PDCCH channel is monitored, downlink control information borne by the channel is demodulated based on HARQ network temporary identity notified by the base station. In an embodiment, the HARQ-RNTI may be for multiple user equipment, that is, the downlink control information scrambled by HARQ-RNTI has the HARQ feedback information for multiple user equipment.

In step 304, the HARQ information corresponding to the sent uplink data is acquired from a corresponding information field of the downlink control information based on a second correspondence between different information fields of the downlink control information and different user equipment. In an embodiment, the second correspondence may be determined based on a signaling sent by the base station or based on a predefined mapping rule of the system. For example, the base station may configure a HARQ ID for each user equipment through a RRC signaling, or a MAC CE, or physical layer signaling, so that the user equipment may acquire its own HARQ feedback information in the corresponding information field based on the HARQ ID. For example, through the RRC signaling, the MAC CE, or the physical layer signaling, the base station indicates that a first user is assigned with a HARQI1 identity, a second user is assigned with a HARQID3 identity, and a nth user is assigned with a HARQIDk identity and so on, then the user may demodulate the information field in the DCI, where a first information field bears the HARQ feedback for the user assigned with HARQID1, a third information field bears the HARQ feedback for the user assigned with HARQID3, and a kth information field bears the HARQ feedback for the user assigned with HARQIDk.

In this embodiment, the base station may bear, on the PDCCH channel, the HARQ feedback information for multiple user equipment, and the user equipment may acquire its own HARQ information from a corresponding information field in the DCI information, based on the second correspondence between different information fields of the DCI information and different user equipment, so that a new HARQ feedback mechanism is implemented, which solves the problem in the art of long data transmission delay caused by regular HARQ feedback. Further, waste of resources may be reduce by bearing HARQ feedback information for multiple user equipment through one PDCCH channel.

Figure 4A:
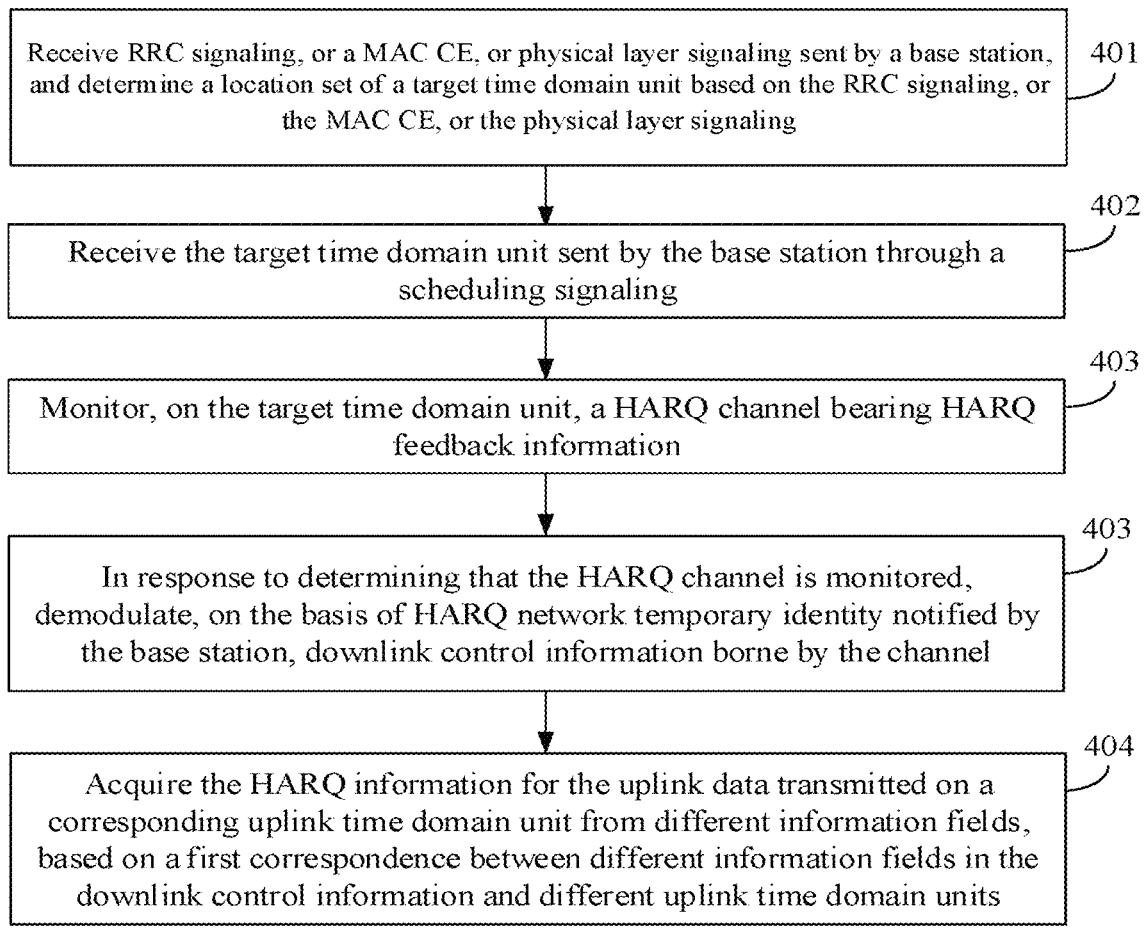
FIG. 4A is a flowchart illustrating another method for transmitting hybrid automatic repeat request information according to an exemplary embodiment.

FIG. 4A is a flowchart illustrating another method for transmitting HARQ information according to an exemplary embodiment, and FIB. 4B is a schematic diagram illustrating resource mapping of a HARQ channel according to an exemplary embodiment. This embodiment uses the above method provided by the embodiments of the present disclosure to exemplarily illustrate how to acquire, by user equipment, the HARQ feedback information sent by a base station through a HARQ channel, where the HARQ feedback information corresponds to uplink data transmitted on more than one uplink time domain unit. As shown in FIG. 4A, the method includes steps described below.

In step 401, a RRC signaling, a MAC CE, or physical layer signaling sent by a base station is received, and a location set of a target time domain unit is determined based on the RRC signaling, the MAC CE, or the physical layer signaling. In an embodiment, the base station may first send, in the RRC signaling, the MAC CE, or the physical layer signaling, location parameters used to determine the location set of the target time domain unit of the HARQ feedback information, so that the user equipment may determine, based on the location parameter borne in the signaling, the location set of the target time domain unit where the base station may send the HARQ feedback information.

Figure 4B:
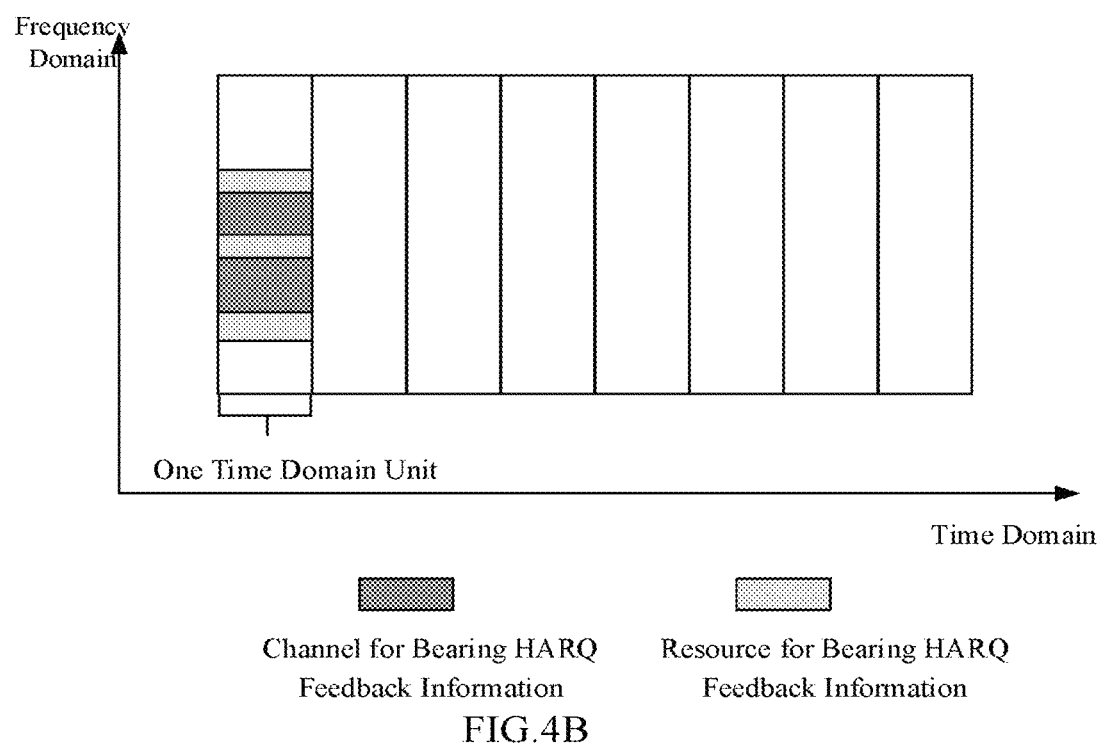
FIG. 4B is a schematic diagram of resource mapping of a HARQ channel according to an exemplary embodiment.

In an embodiment, if the channel bearing the HARQ feedback information is a newly defined dedicated HARQ channel, the base station may notify, through the RRC signaling, the user equipment of the MAC CE, or the physical layer signaling, frequency domain resources and the location set of the target time domain resources occupied by the HARQ channel transmission. FIG. 4B shows a mapping of the newly defined HARQ channel on the target time domain resource and frequency domain resource. The base station may notify, through the RRC signaling, the MAC CE, or the physical layer signaling, a resource block (location set of target time domain resource and frequency domain resource) for transmission of the HARQ channel, but the HARQ channel may only be mapped to one target time domain resource of this resource block.

In step 402, a target time domain unit sent by the base station through a scheduling signaling is received. In an embodiment, after notifying the location parameter used to determine the location set of the target time domain unit, the base station may further notify of the target time domain unit where the base station sends the HARQ feedback information, through a scheduling signaling.

In step 403, a HARQ channel hearing HARQ information is monitored on the target time domain unit.

In step 404, when the HARQ channel is monitored, on the basis of HARQ network temporary identity notified by the base station, the downlink control information borne by the channel is demodulated. In an embodiment, step 404 may refer to the description of step 102 in the embodiment shown in FIG. 1A, which will not be described in detail here.

In step 405, on the basis of a first correspondence between different information fields of the downlink control information and different uplink time domain units, the HARQ information for the uplink data transmitted on a corresponding uplink time domain unit is acquired from different information fields. In an embodiment, one HARQ channel may bear the HARQ feedback information for uplink data sent by one user equipment on more than one time domain unit, and the user equipment may acquire, based on the first correspondence between different information fields of the DO information and different uplink time domain units, the HARQ information for the uplink data transmitted on the corresponding uplink time domain unit from different information fields.

In an embodiment, the first correspondence is determined based on a predefined mapping rule of the system. In an embodiment, the first correspondence is determined based on the RRC signaling, the MAC CE, or the physical layer signaling sent by the base station.

In this embodiment, the base station may bear, on one newly defined HARQ channel, the HARQ information for the uplink data of multiple uplink time domain units of one user equipment, and the user equipment may acquire, based on the first correspondence between different information fields of the DCI information and uplink time domain units, the HARQ information corresponding to the corresponding uplink time domain unit from different information fields, so that a new HARQ feedback mechanism is implemented, which solves the problem in the art of long data transmission delay caused by regular HARQ feedback. Further, waste of resources may be reduced by bearing, through one HARQ channel, the HARQ information for the uplink data of multiple uplink time domain units of one user equipment.

Figure 5:
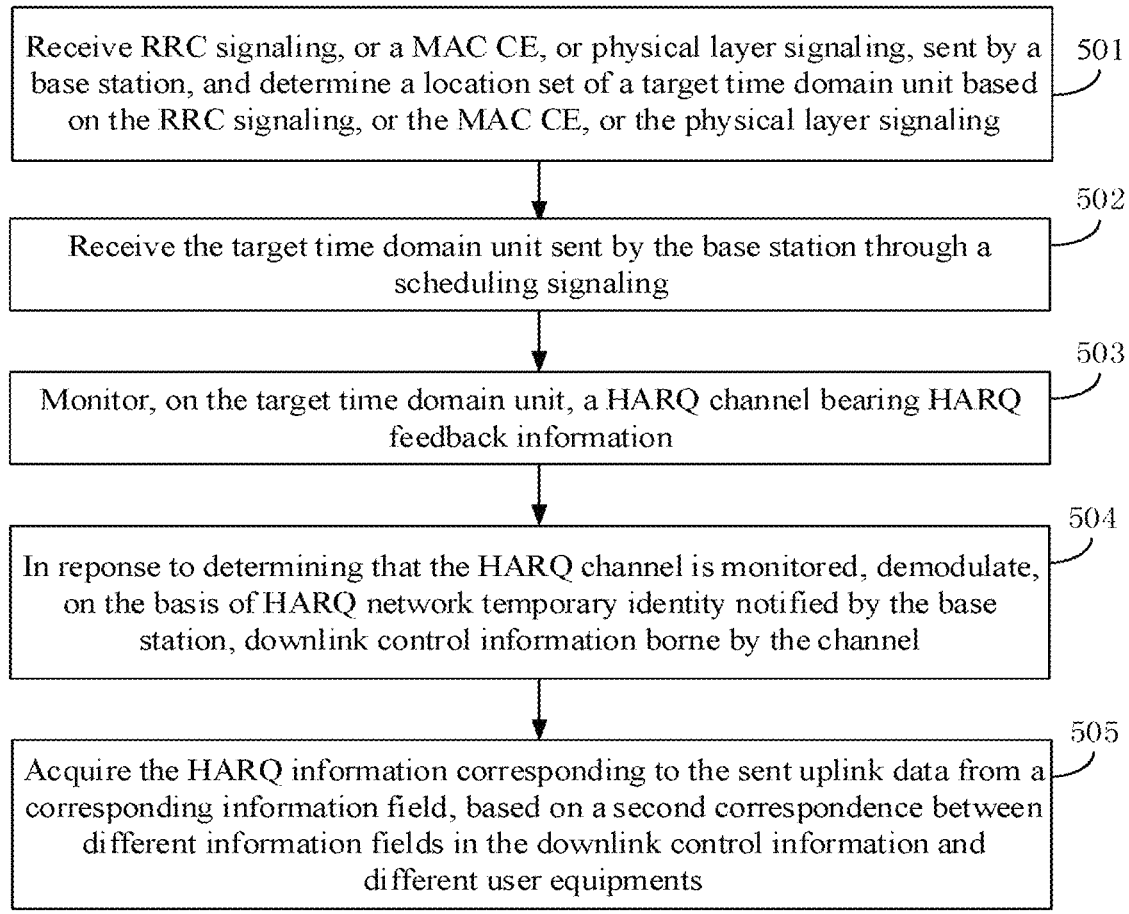
FIG. 5 is a flowchart illustrating another method for transmitting hybrid automatic repeat request information according to an exemplary embodiment.

FIG. 5 is a flowchart illustrating another method for transmitting HARQ information according to an exemplary embodiment. This embodiment uses the above method provided by the embodiments of the present disclosure to exemplarily illustrate how to acquire, by user equipment, HARQ feedback information for multiple user equipment sent by a base station through a HARQ channel. As shown in FIG. 3, the method includes steps described below.

In step 501, a RRC signaling, a MAC CE, or a physical layer signaling sent by a base station is received, and a location set of a target time domain unit is determined based on the RRC signaling, the MAC CE, or the physical layer signaling.

In step 502, a target time domain unit sent by the base station through a scheduling signaling is received.

In step 503, a HARQ channel bearing HARQ information is monitored on the target time domain unit.

In an embodiment, steps 501-503 may refer to the description of steps 401-403 in the embodiment shown in FIG. 4B, which will not be described in detail here.

In step 504, when the HARQ channel is monitored, downlink control information borne by the channel is demodulated based on HARQ network temporary identity notified by the base station. In an embodiment, the HARQ-RNTI may be for multiple user equipment, that is, the downlink control information scrambled by HARQ-RNTI has the HARQ feedback information for multiple user equipment.

In step 505, on the basis of a second correspondence between different information fields of the downlink control information and different user equipment, the HARQ information corresponding to the sent uplink data is acquired from a corresponding information field. In an embodiment, the second correspondence may be determined based on a signaling sent by the base station. For example, the base station may configure a HARQ ID for each user equipment through a RRC signaling, a MAC CE, or a physical layer signaling, so that the user equipment may acquire its own HARQ feedback information in the corresponding information field based on the HARQ ID.

In this embodiment, the base station may bear the HARQ feedback information for multiple user equipment on the HARQ channel, and the user equipment may acquire, based on the second correspondence between different information fields of the DCI information and different user equipment, its own HARQ information from a corresponding information field, so that a new HARQ feedback mechanism is implemented, which solves the problem in the art of long data transmission delay caused by regular HARQ feedback. Further, waste of resources may be reduced by bearing the HARQ feedback information for multiple user equipment through one HARQ channel.

Figure 6:
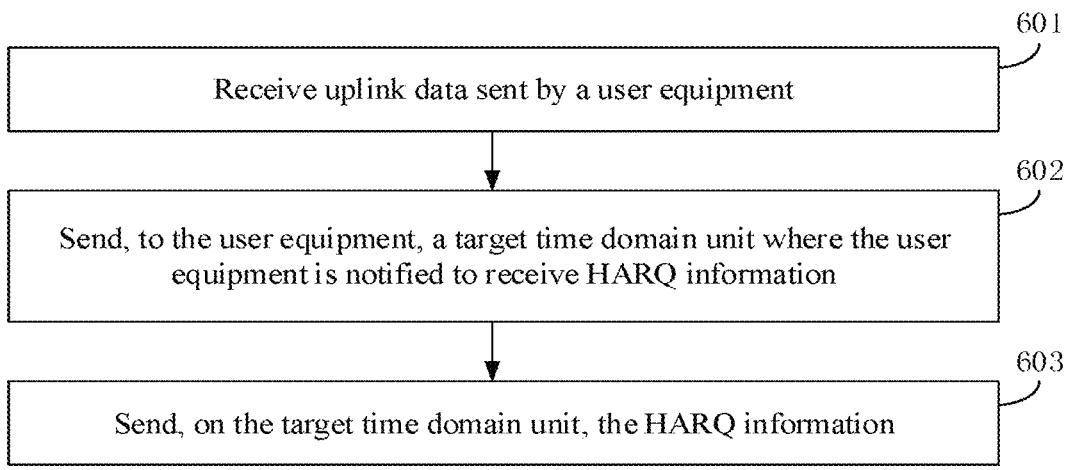
FIG. 6 is a flow chart illustrating a method for transmitting hybrid automatic repeat request information according to an exemplary embodiment.

FIG. 6 is a flowchart illustrating a method for transmitting hybrid automatic repeat request (HARQ) information according to an exemplary embodiment. This embodiment may be applied on a base station. As shown in FIG. 6, the method for transmitting HARQ information includes steps 601-603 described below.

In step 601, uplink data sent by user equipment is received.

In step 602, a target time domain unit where the user equipment is notified to receive the HARQ information is sent to the user equipment. In an embodiment, after receiving the uplink data sent by the user equipment, the base station may notify, through a scheduling signaling, the user equipment of the target time domain unit where the terminal monitors the HARQ feedback information. A time interval between the target time domain unit and the time domain unit where the user equipment sends data (that is, a time interval between sending the uplink data by the user equipment and sending the HARQ feedback information by the base station) may be determined by the base station based on capacity of the user equipment.

In an embodiment, the time interval between sending the uplink data sent by the user equipment and sending the HARQ feedback information by the base station may be determined by the base station, and the time interval between sending downlink data by the base station and responding to the HARQ feedback information by the user equipment may also be determined by the base station based on the capability of the user equipment.

In step 603, the HARQ information is sent on the target time domain unit. In an embodiment, the base station may send, on the target time domain unit, the HARQ information through a PDCCH channel or a HARQ channel. Further, the PDCCH channel or the HARQ channel may bear the HARQ feedback information corresponding to the uplink data sent on multiple uplink time domain units of one user equipment. In an embodiment, the PDCCH channel or the HARQ channel may bear HARQ feedback information for multiple user equipment.

In an embodiment, the base station may also send a HARQ network temporary identity to the user equipment through a RRC signaling; or send a HARQ network temporary identity to the user equipment through a MAC CE; or send a HARQ network temporary identity to the user equipment through physical layer signaling.

In an exemplary scenario, as shown in FIG. 1B, taking a mobile network as a 5G network and a base station as a gNB as an example for illustration, the scenario shown in FIG. 1B includes a gNB10 and a UE 20. When data transmission is performed between the gNB 10 and the UE 20, for example, after the UE 20 sends data to the gNB 10, the gNB 10 may notify, through a scheduling signaling, a specified target time domain unit where the UE20 monitors the channel to implement a non-regular HARQ feedback mechanism.

In this embodiment, through the above steps 601-603, the base station may determine the target time domain unit for sending HARQ feedback information when receiving the uplink data sent by the user equipment, and notify the user equipment of the target time domain unit. In this way, the user equipment may accurately acquire the HARQ feedback information from the specified target time domain unit.

Figure 7:
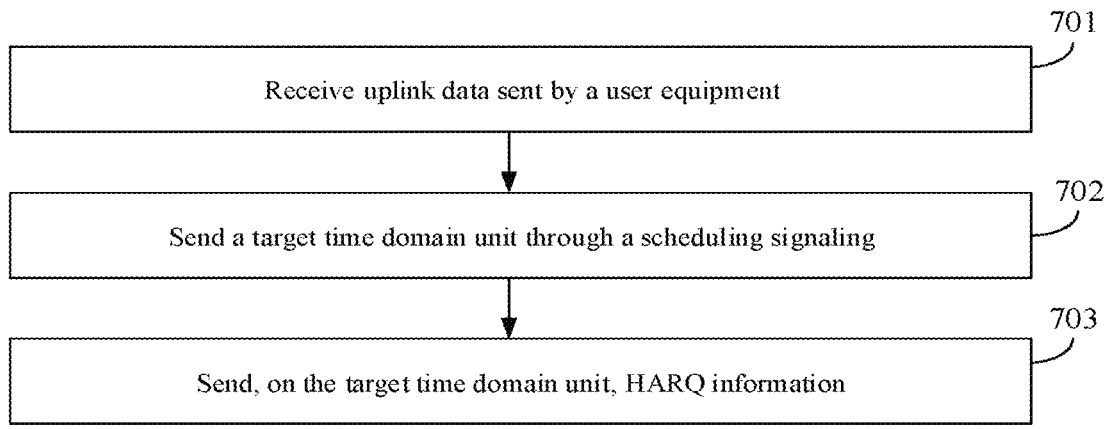
FIG. 7 is a flowchart illustrating another method for transmitting hybrid automatic repeat request information according to an exemplary embodiment.

FIG. 7 is a flowchart illustrating another method for transmitting hybrid automatic repeat request information (HARQ) according to an exemplary embodiment. This embodiment uses the above method provided by the embodiments of the present disclosure to exemplarily illustrate how to notify, by a base station, user equipment to acquire HARQ feedback information when the HARQ is sent by the base station through a PDCCH channel. As shown in FIG. 7, the method includes steps described below.

In step 701, uplink data sent by user equipment is received.

In step 702, a target time domain unit is sent through a scheduling signaling. In an embodiment, the method for notifying the user equipment of the target time domain unit through the scheduling signaling may refer to the prior art solution, which is not described in detail here.

In step 703, the HARQ information is sent on the target time domain unit. In an embodiment, a PDCCH channel may bear HARQ feedback information corresponding to uplink data sent on multiple uplink time domain units by one user equipment, and a base station may bear corresponding HARQ information in different information fields of the DCI based on a first correspondence between different information fields of the DCI information and the uplink time domain units, and send, on the target time domain unit, the HARQ information.

In an embodiment, the PDCCH channel may bear HARQ feedback information for multiple user equipment. In this case, the base station may bear corresponding HARQ information in different information fields of the DCI based on a second correspondence between different information fields of the DCI information and different user equipment, and send, on the target time domain unit, the HARQ information.

In this embodiment, the base station may bear, on the PDCCH channel, the HARQ feedback information for multiple user equipment or HARQ feedback information for uplink data of multiple uplink time domain units for one user equipment, and the user equipment may accurately acquire the HARQ feedback information from a corresponding information field based on a correspondence between different information fields of the DCI information and the HARQ feedback information, so that a new HARQ feedback mechanism is implemented, which solves the problem in the art of long data transmission delay caused by regular HARQ feedback. Further, waste of resources may be reduced by bearing, through one PDCCH channel, the HARQ feedback information for multiple user equipment.

Figure 8:
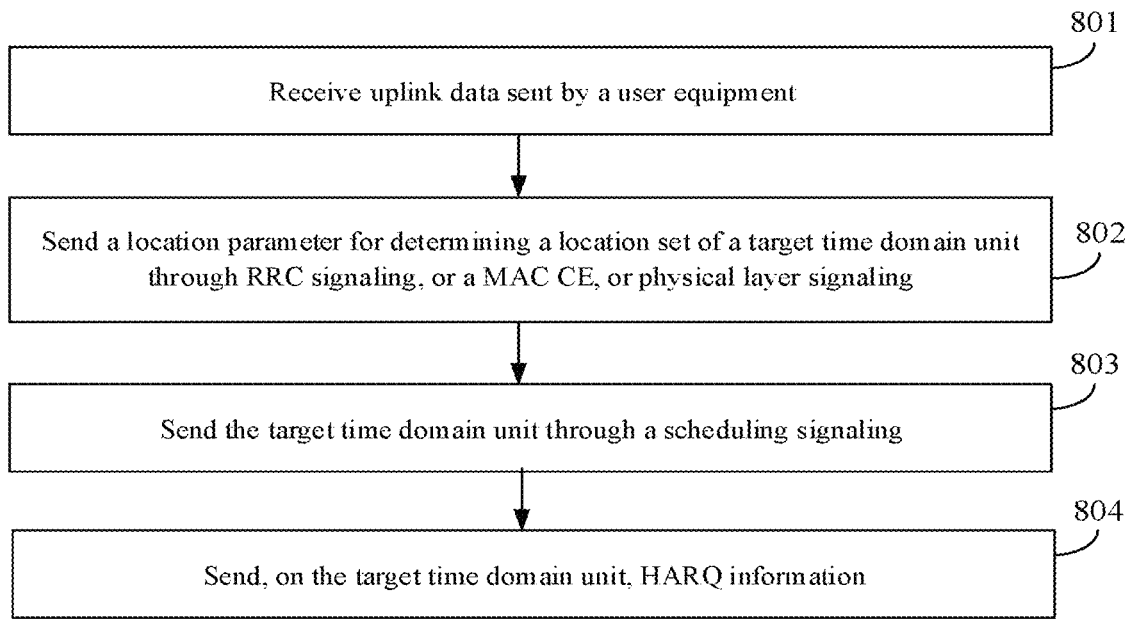
FIG. 8 is a flow chart showing yet another method for transmitting hybrid automatic repeat request information according to an exemplary embodiment.

FIG. 8 is a flowchart illustrating yet another method for transmitting HARQ information according to an exemplary embodiment. This embodiment uses the above method provided by the embodiments of the present disclosure to exemplarily illustrate how to notify, by a base station, user equipment to acquire HARQ feedback information when the HARQ is sent by the base station through a HARQ channel. As shown in FIG. 8, the method includes steps described below.

In step 801, uplink data sent by user equipment is received.

In step 802, location parameters for determining a location set of the target time domain unit is sent through a RRC signaling, a MAC CE, or a physical layer signaling. In an embodiment, in addition to sending the location parameters of the location set of the target time domain unit through the RRC signaling, the MAC CE, or the physical layer signaling, the base station may also indicate a frequency domain resource.

In step 803, the target time domain unit is sent through a scheduling signaling.

In step 804, the HARQ information is sent on the target time domain unit. In an embodiment, the base station may send, on the target time domain unit and frequency domain resource, the HARQ information through a HARQ channel. Further, the HARQ channel may bear the HARQ feedback information corresponding to uplink data sent on multiple uplink time domain units by one user equipment, and the base station may bear corresponding HARQ information in different information fields of the DCI based on a first correspondence between different information fields of the DCI information and the uplink time domain units, and send the HARQ information on the target time domain unit.

In an embodiment, the HARQ channel may bear the HARQ feedback information for multiple user equipment, and the base station may bear corresponding HARQ information in different information fields of the DCI based on a second correspondence between different information fields of the DCI information and the user equipment, and send the HARQ information on the target time domain unit.

In this embodiment, the base station may bear, on the HARQ channel, the HARQ feedback information for multiple user equipment or the HARQ feedback information for the uplink data on multiple uplink time domain units of one user equipment, and the user equipment may accurately acquire the HARQ feedback information from a corresponding information field based on a correspondence between different information fields of the DCI information and the HARQ feedback information, so that a new HARQ feedback mechanism is implemented, which solves the problem in the art of long data transmission delay caused by regular HARQ feedback. Further, waste of resources may be reduced by bearing, through one HARQ channel, the HARQ feedback information for multiple user equipment.

Figure 9:
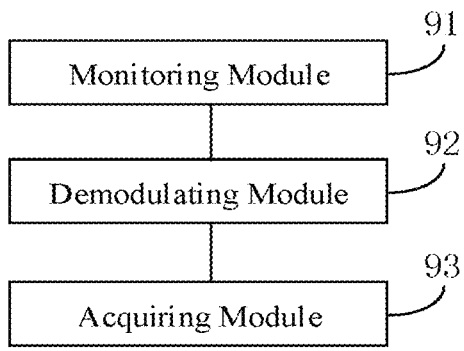
FIG. 9 is a block diagram illustrating a device for transmitting hybrid automatic repeat request information according to an exemplary embodiment.

FIG. 9 is a block diagram illustrating a device for transmitting HARQ information according to an exemplary embodiment. The device for transmitting HARQ information is applied to user equipment. As shown in FIG. 9, the device includes a monitoring module 91, a demodulating module 92, and an acquiring module 93.

The monitoring module 91 is configured to monitor, on a target time domain unit, a channel bearing the HARQ information.

The demodulating module 92 is configured to: in response to determining that the channel is monitored, demodulate, on the basis of a HARQ network temporary identity notified by a base station, downlink control information borne by the channel.

The acquiring module 93 is configured to acquire the HARQ information from a specified information field of the downlink control information.

In this embodiment, after sending data to the base station, the user equipment may determine the target time domain unit based on the scheduling of the base station, and monitor, on the target time domain unit, the channel bearing the HARQ information, and after a successful demodulation is made, the user equipment may acquire the HARQ information from the specified information field of the downlink control information. Therefore, through the above technical solution, the user equipment is scheduled by a base station to send or receive the HARQ feedback information on a specified time domain unit, thereby solving the problem in the art of long data transmission delay caused by regular HARQ feedback.

Figure 10:
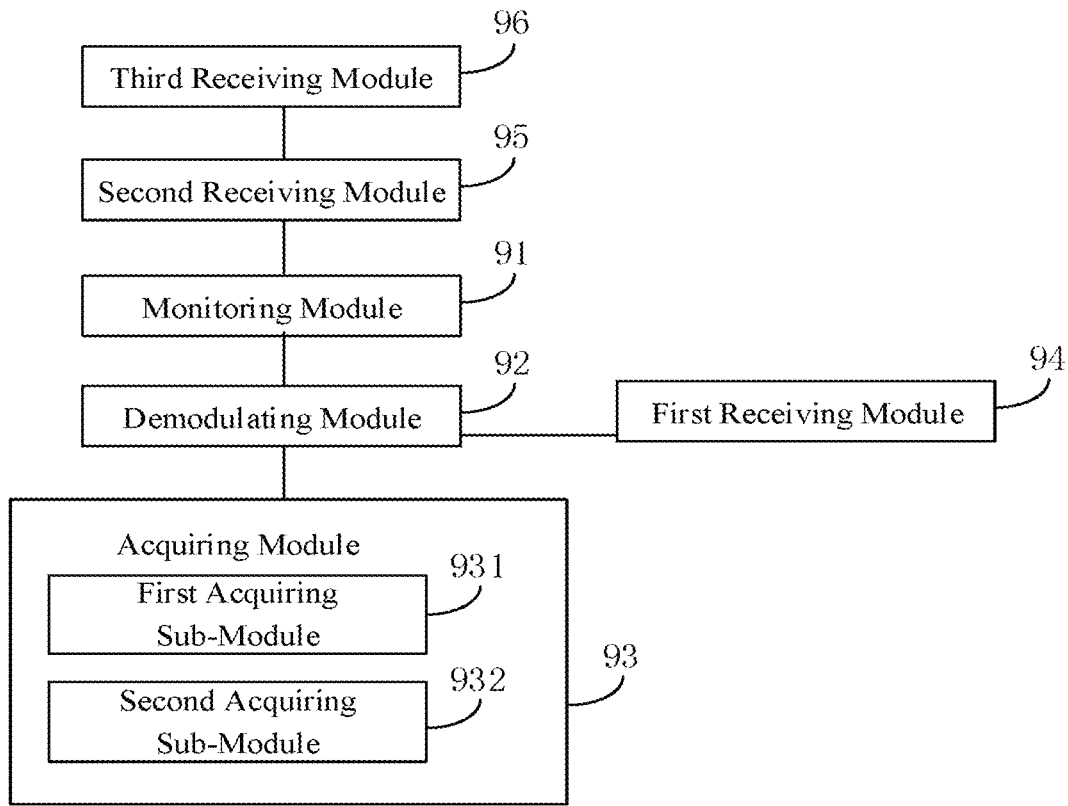
FIG. 10 is a block diagram illustrating another device for transmitting hybrid automatic repeat request information according to an exemplary embodiment.

FIG. 10 is a block diagram illustrating another device for transmitting HARQ information according to an exemplary embodiment. As shown in FIG. 10, based on the above embodiment shown in FIG. 9, in an embodiment, the device can further include a first receiving module 94 that is configured to receive a HARQ network temporary identity sent by a base station through a RRC signaling, receive the HARQ network temporary identity sent by the base station through a MAC CE, or receive the HARQ network temporary identity sent by the base station through a physical layer signaling.

This embodiment provides several manners of acquiring the HARQ network temporary identity by the user equipment, and the flexibility is high.

In an embodiment, the channel is a Physical Downlink Control Channel (PDCCH), or a dedicated HARQ channel.

In an embodiment, the device further includes: a second receiving module 95, configured to receive a scheduling signaling sent by the base station, where the scheduling signaling bears the target time domain unit.

When the channel is the dedicated HARQ channel, the device can further include a third receiving module 96 that is configured to receive the RRC signaling, the MAC CE, or the physical layer signaling sent by the base station, and determine a location set of the target time domain unit based on the RRC signaling, the MAC CE, or the physical layer signaling.

This embodiment discloses the manner for acquiring the target time domain unit where the user equipment monitors the channel in the case that the channel bearing the HARQ information is the PDCCH channel or the HARQ channel, thereby implementing a non-regular HARQ feedback mechanism.

In this embodiment, when the channel bears the HARQ information corresponding to the uplink data sent by the user equipment on more than two uplink time domain units, the acquiring module 93 includes a first acquiring sub-module 931.

The first acquiring sub-module 931 can be configured to, on the basis of a first correspondence between different information fields of the downlink control information and different uplink time domain units, acquire the HARQ information for the uplink data transmitted on a corresponding uplink time domain unit from different information fields. The first correspondence can be determined based on a predefined mapping rule of the system, or the first correspondence can be determined based on the RRC signaling, the MAC CE, or the physical layer signaling sent by the base station.

In this embodiment, the user equipment may acquire the HARQ feedback information corresponding to the corresponding uplink time domain unit from different information fields based on the first correspondence between different information fields of the DCI information and the uplink time domain units, so that a new HARQ feedback mechanism is implemented, which solves the problem in the art of long data transmission delay caused by regular HARQ feedback. Further, waste of resources may be reduced by bearing, through one PDCCH channel, the HARQ information for the uplink data on multiple uplink time domain units of one user equipment.

In an embodiment, when the channel bears the HARQ information corresponding to the uplink data sent by more than two user equipment, the acquiring module 93 includes a second acquiring sub-module 932. The second acquiring sub-module 932 can be configured to, on the basis of a second correspondence between different information fields of the downlink control information and different user equipment, acquire the HARQ information corresponding to the sent uplink data from a corresponding information field.

In an embodiment, the second correspondence is determined based on the RRC signaling, the MAC CE, or the physical layer signaling sent by the base station.

In this embodiment, the user equipment may acquire its own HARQ information from a corresponding information field based on the second correspondence between different information fields of the DCI information and different user equipment, so that a new HARQ feedback mechanism is implemented, which solves the problem in the art of long data transmission delay caused by regular HARQ feedback. Further, waste of resources may be reduced by bearing the HARQ feedback information for multiple user equipment through one PDCCH channel.

Figure 11:
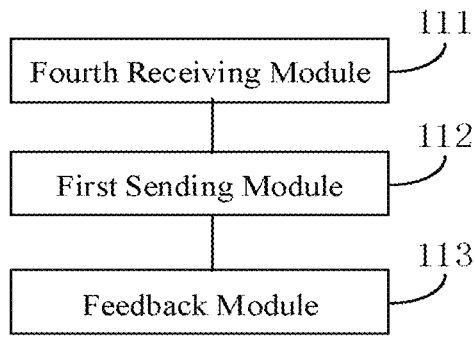
FIG. 11 is a block diagram illustrating a device for transmitting hybrid automatic repeat request information according to an exemplary embodiment.

FIG. 11 is a block diagram illustrating a device for transmitting HARQ information according to an exemplary embodiment. The device for transmitting HARQ information is applied to a base station. As shown in FIG. 11, the device includes a fourth receiving module 111, a first sending module 112 and a feedback module 113.

The fourth receiving module 111 is configured to receive uplink data sent by user equipment.

The first sending module 112 is configured to send, to the user equipment, a target time domain unit where the user equipment is notified to receive the HARQ information.

The feedback module 113 is configured to send, on the target time domain unit, the HARQ information.

In this embodiment, the base station may bear, on a newly defined HARQ channel, the HARQ information for the uplink data on multiple uplink time domain units of one user equipment, and the user equipment may acquire the HARQ information for the corresponding uplink time domain unit from different information fields, based on a first correspondence between different information fields of the DCI information and uplink time domain units, so that a new HARQ feedback mechanism is implemented, which solves the problem in the art of long data transmission delay caused by regular HARQ feedback. Further, waste of resources may be reduced by bearing, through one HARQ channel, the HARQ information for the uplink data on multiple uplink time domain units of one user equipment.

Figure 12:
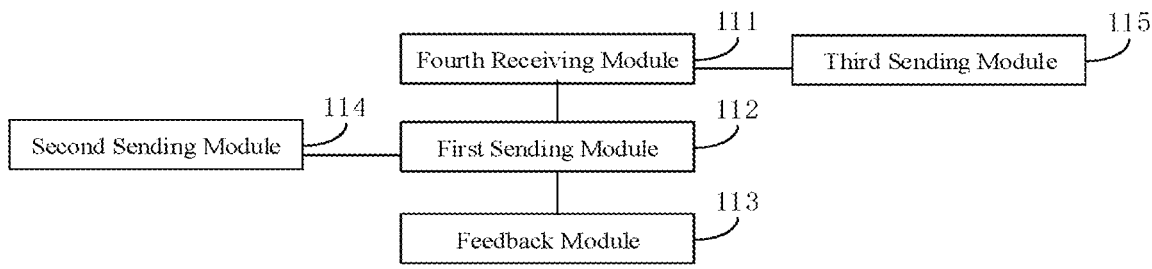
FIG. 12 is a block diagram illustrating a device for transmitting hybrid automatic repeat request information according to an exemplary embodiment.

FIG. 12 is a block diagram illustrating a device for transmitting HARQ information according to an exemplary embodiment. As shown in FIG. 12, on the basis of the above embodiment shown in FIG. 11, in an embodiment, the first sending module 112 is configured to send the target time domain unit through a scheduling signaling.

When a channel bearing the HARQ information is a dedicated HARQ channel, the device further includes a second sending module 114.

The second sending module 114 is configured to send, through a RRC signaling, a MAC CE, or a physical layer signaling, a location parameter for determining a location set of the target time domain unit.

In this embodiment, the base station may bear, on the PDCCH channel, the HARQ feedback information for multiple user equipment or HARQ feedback information for uplink data on multiple uplink time domain units of one user equipment, so that a new HARQ feedback mechanism is implemented, which can reduce long data transmission delay caused by regular HARQ feedback. Further, waste of resources may be reduced by bearing the HARQ feedback information for multiple user equipment through one PDCCH channel.

In an embodiment, the device further includes a third sending module 115 that can be configured to send, to the user equipment, a HARQ network temporary identity through the RRC signaling, send, to the user equipment, the HARQ network temporary identity through the MAC CE, or send, to the user equipment, the HARQ network temporary identity through the physical layer signaling.

This embodiment provides several manners for notifying, by the base station, the user equipment of the HARQ network temporary identity, and the flexibility is high.

Regarding the device in the above embodiment, a specific manner in which each module performs the operation has been described in detail in the embodiment related to the method, and will not be described in detail here.

Figure 13:
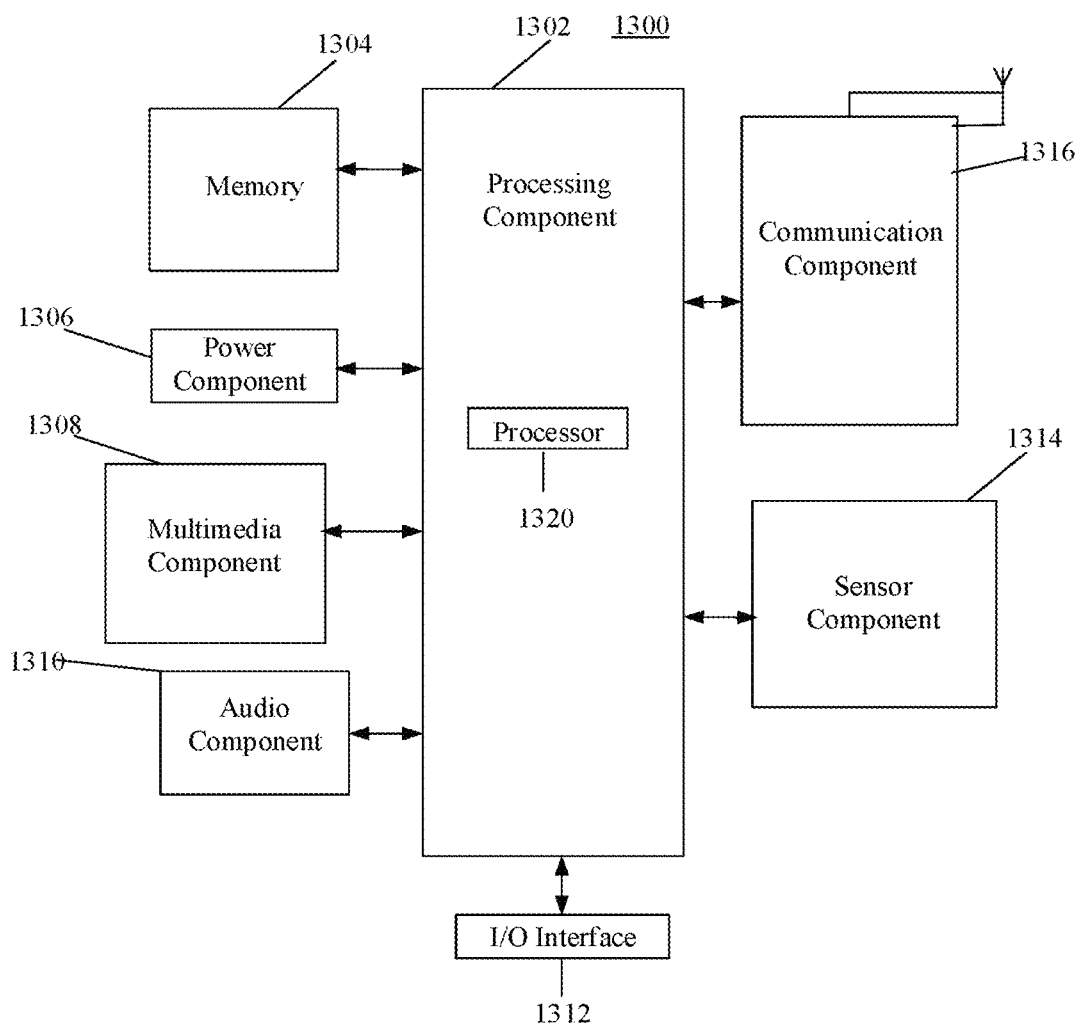
FIG. 13 is a block diagram illustrating a device suitable for transmitting hybrid automatic repeat request information according to an exemplary embodiment.

FIG. 13 is a block diagram illustrating a device suitable for transmitting HARQ information according to an exemplary embodiment. For example, a device 1300 may be a mobile phone, a computer, a digital broadcasting terminal, a message transceiver, a game console, a tablet, a medical device, a fitness device, a personal digital assistant, and other user equipment. The device 1300 may be either a base station or user equipment.

Referring to FIG. 13, the device 1300 may include one or more of the following components a processing component 1302, a memory 1304, a power component 1306, a multimedia component 1308, an audio component 1312, an input/output (I/O) interface 1312, a sensor component 1314, and a communication component 1316.

The processing component 1302 is generally configured to control the overall operations of the device 1300, such as operations associated with displaying, telephone calls, data communications, camera operations, and recording operations. The processing component 1302 may include one or more processors 1320 used to execute instructions to complete all or part of the steps in the above method. In addition, the processing component 1302 may include one or more modules used to facilitate interaction between the processing component 1302 and other components. For example, the processing component 1302 may include a multimedia module to facilitate interaction between the multimedia component 1308 and the processing component 1302.

The memory 1304 is configured to store various types of data to support operation on the device 1300. Examples of these data include instructions for any application or method operating on the device 1300, contact data, phone book data, messages, pictures, videos, and so on. The memory 1304 may be implemented by any type of volatile or non-volatile storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or an optical disk.

The power component 1306 supplies power to various components of the device 1300. The power component 1306 may include a power management system, one or more power supplies, and other components associated with generating, managing, and distributing power for the device 1300.

The multimedia component 1308 includes a screen providing an output interface between the device 1300 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors for sensing touch, swipe, and gestures on the touch panel. The touch sensor may not only sense the boundary of the touch or swiping action, but also detect the duration and pressure related to the touch or swiping operation. In some embodiments, the multimedia component 1308 includes a front camera and/or a rear camera. When the device 1300 is in an operation mode, such as a shooting mode or a video mode, the front camera and/or the rear camera may receive external multimedia data. Each front camera and rear camera may be a fixed optical lens system or have focal length and optical zoom capabilities.

The audio component 1312 is configured to output and/or input audio signals. For example, the audio component 1312 includes a microphone (MIC), and when the device 1300 is in an operation mode, such as a call mode, a recording mode, and a voice recognition mode, the microphone is configured to receive an external audio signal. The received audio signal may be further stored in the memory 1304 or transmitted via the communication component 1314. In some embodiments, the audio component 1312 further includes a speaker for outputting audio signals.

The I/O interface 1312 provides an interface between the processing component 1302 and a peripheral interface module. The peripheral interface module may be a keyboard, a click wheel, or a button. These buttons may include, but are not limited to: home button, volume button, start button, and lock button.

The sensor component 1314 includes one or more sensors for providing the device 1300 with status assessments in various aspects. For example, the sensor component 1314 may detect the on/off state of the device 1300, and the relative positioning of the components, such as the display and keypad of the device 1300, and the sensor component 1314 may also detect position change of the device 1300 or a component of the device 1300, presence or absence of a user contact with the device 1300, and orientation or acceleration/deceleration of the device 1300 temperature change of the device 1300. The sensor component 1314 may include a proximity sensor configured to detect the presence of nearby objects without any physical contact. The sensor component 1314 may also include a light sensor, such as a Complementary Metal-Oxide-Semiconductor Transistor (CMOS) or Charge Coupled Devic (CCD) image sensor, for use in imaging applications. In some embodiments, the sensor component 1314 may further include an acceleration sensor, a gyro sensor, a magnetic sensor, a pressure sensor, or a temperature sensor.

The communication component 1316 is configured to facilitate wired or wireless communication between the device 1300 and other devices. The device 1300 may access a wireless network based on a communication standard, such as WiFi, 2G, or 3G, or a combination thereof. In an exemplary embodiment, the communication component 1316 receives a broadcast signal or broadcast related information from an external broadcast management system via a broadcast channel. In an exemplary embodiment, the communication component 1316 further includes a Near Field Communication (NFC) module to facilitate short-range communication. For example, the NFC module may be implemented based on Radio Frequency identification (RFID) technology, infrared Data Association (IrDA) technology, Ultra-WideBand (UWB) technology, BlueTooth (BT) technology and other technologies.

In an exemplary embodiment, the device 1300 may be implemented by one or more Application Specific Integrated Circuits (ASIC). Digital Signal Processors (DSP), Digital Signal Processing Devices (DSPD), Programmable Logic Devices (PLD), Field Programmable Gate Arrays (FPGA), controllers, microcontrollers, microprocessors or other electronic components is implemented to perform the method described in the first aspect above, for performing the method described in the first aspect above.

In an exemplary embodiment, there is also provided a non-transitory computer-readable storage medium including instructions, such as a memory 1304 including instructions. When the above instructions are executed, the processor 1320 of the device 1300 is configured to execute the method described in the first aspect above.

Figure 14:
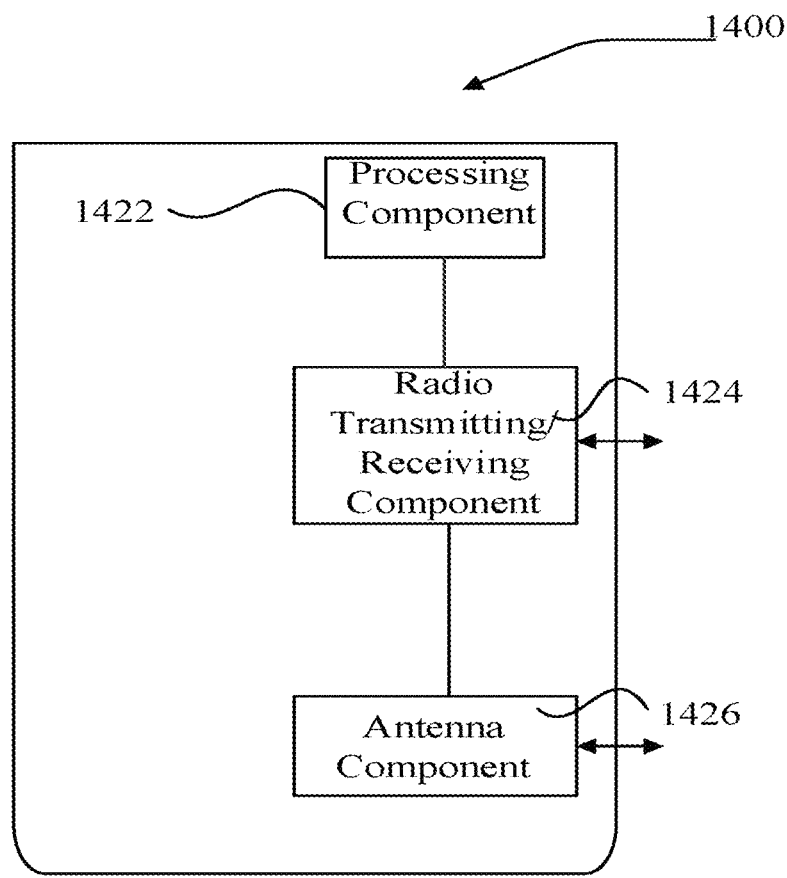
FIG. 14 is a block diagram illustrating a device suitable for transmitting hybrid automatic repeat request information according to an exemplary embodiment.

FIG. 14 is a block diagram illustrating a device suitable for transmitting hybrid automatic repeat request information according to an exemplary embodiment. The device 1400 may be provided as a base station. Referring to FIG. 14, the device 1400 includes a processing component 1422, a radio transmission/reception component 1424, an antenna component 1426, and a signal processing part unique to a radio interface. The processing component 1422 may further include one or more processors.

One of the processors in the processing component 1422 may be configured to perform the method described in the second aspect above.

In an exemplary embodiment, a non-transitory computer-readable storage medium including instructions is also provided in a base station. The storage medium stores computer instructions. When the instructions are executed by a processor, the method described in the second aspect above is implemented.

Those skilled in the art will easily think of other embodiments of the present disclosure after considering the specification and practicing the disclosure disclosed herein. This disclosure is intended to cover any variations, uses, or adaptive changes of the present disclosure that follow the general principles of the present disclosure and include common general knowledge or customary technical means in the technical field not disclosed in the present disclosure. The description and examples are to be considered exemplary only, and the true scope and spirit of this disclosure are pointed out by the following claims.

It should be understood that the present disclosure is not limited to the precise structure that has been described above and shown in the drawings, and that various modifications and changes may be made without departing from the scope thereof. The scope of the present disclosure is limited only by the appended claims.

What is claimed is:

1. A method for transmitting hybrid automatic repeat request (HARQ) information that is applied to user equipment, the method comprising:
   monitoring a channel bearing the HARQ information on a target time domain unit;
   demodulating, on the basis of a HARQ network temporary identity notified by a base station, downlink control information borne by the channel in response to determining that the channel is monitored; and
   acquiring the HARQ information from a specified information field of the downlink control information.

2. The method according to claim 1, further comprising:
   receiving the HARQ network temporary identity sent through a radio resource control (RRC) signaling by the base station;
   receiving the HARQ network temporary identity sent through a media access control-control element (MAC CE) by the base station; or
   receiving the HARQ network temporary identity sent through a physical layer signaling by the base station.

3. The method according to claim 1, wherein the channel is a physical downlink control channel or a dedicated HARQ channel.

4. The method according to claim 3, further comprising:
   receiving a scheduling signaling sent by the base station, where the scheduling signaling hears the target time domain unit; and
   in response to determining that the channel is the dedicated HARQ channel, before receiving a scheduling signaling sent by the base station, the method further comprises:
   receiving a radio resource control (RRC) signaling, a media access control-control element (MAC CE), or a physical layer signaling sent by the base station, and determining a location set of the target time domain unit based on the RRC signaling, the MAC CE, or the physical layer signaling.

5. The method according to claim 1, wherein, in response to determining that the channel bears the HARQ information for uplink data sent by the user equipment on more than two uplink time domain units, acquiring the HARQ information from a specified information field of the downlink control information further comprises:
   acquiring, based on a first correspondence between different information fields of the downlink control information and different uplink time domain units, the HARQ information for the uplink data transmitted on a corresponding uplink time domain unit from different information fields.

6. The method according to claim 5, wherein the first correspondence is determined based on at least one of: a mapping rule predefined by a system, a radio resource control (RRC) signaling, a media access control-control element (MAC CE), and a physical layer signaling sent by the base station.

7. The method according to claim 1, wherein, in response to determining that the channel bears the HARQ information for the uplink data sent by more than two user equipment, acquiring the HARQ information from a specified information field of the downlink control information further comprises:
   acquiring the HARQ information for the sent uplink data from a corresponding information field based on a second correspondence between different information fields of the downlink control information and different user equipment.

8. The method according to claim 7, wherein the second correspondence is determined based on one of: a radio resource control (RRC) signaling, a media access control-control element (MAC CE), and a physical layer signaling sent by the base station.

9. A method for transmitting hybrid automatic repeat request (HARQ) information that is applied to a base station, the method comprising:
receiving uplink data sent by user equipment;
sending, to the user equipment, a target time domain unit where the user equipment is notified to receive the HARQ information; and
sending the HARQ information on the target time domain unit;
wherein sending, to the user equipment, a target time domain unit where the user equipment is notified to receive the HARQ information further comprises:
sending the target time domain unit through a scheduling signaling; and
in response to determining that a channel bearing the HARQ information is a dedicated HARQ channel, before sending the target time domain unit through the scheduling signaling, the method further comprises:
sending a location parameter for determining a location set of the target time domain unit through one of a radio resource control (RRC) signaling, a media access control-control element (MAC CE), and a physical layer signaling.

10. The method according to claim 9, further comprising sending a HARQ network temporary identity to the user equipment through one of:
a radio resource control (RRC) signaling;
a media access control-control element (MAC CE); and
a physical layer signaling.

11. User equipment, comprising a processor and a storage device for storing computer executable instructions that, when executed by the processor, cause the processor to:
monitor a channel bearing the HARQ information on a target time domain unit;
demodulate downlink control information borne by the channel in response to determining that the channel is monitored on the basis of a HARQ network temporary identity notified by a base station; and
acquire the HARQ information from a specified information field of the downlink control information.

12. The user equipment according to claim 11, wherein the processor is further configured to:
receive the HARQ network temporary identity sent through a radio resource control (RRC) signaling by the base station;
receive the HARQ network temporary identity sent through a media access control-control element (MAC CE) by the base station; or
receive the HARQ network temporary identity sent through a physical layer signaling by the base station.

13. The user equipment according to claim 11, wherein the channel is a physical downlink control channel or a dedicated HARQ channel.

14. The user equipment according to claim 13, wherein:
the processor is further configured to receive a scheduling signaling sent by the base station, where the scheduling signaling bears the target time domain unit, and
in response to determining that the channel is the dedicated HARQ channel, the processor is further configured to receive a radio resource control (RRC) signaling, a media access control-control element (MAC CE), or a physical layer signaling sent by the base station, and determine a location set of the target time domain unit based on the RRC signaling, the MAC CE, or the physical layer signaling.

15. The user equipment according to claim 11, wherein in response to determining that the channel bears the HARQ information for uplink data sent by the user equipment on more than two uplink time domain units, the processor is further configured to:
acquire the HARQ information for the uplink data transmitted on a corresponding uplink time domain unit from different information fields based on a first correspondence between different information fields of the downlink control information and different uplink time domain units.

16. The user equipment according to claim 15, wherein the first correspondence is determined based on a mapping rule predefined by a system; or the first correspondence is determined based on a radio resource control (RRC) signaling, a media access control-control element (MAC CE), or a physical layer signaling sent by the base station.

17. The user equipment according to claim 11, wherein, in response to determining that the channel bears the HARQ information for the uplink data sent by more than two user equipment, the processor is further configured to acquire the HARQ information for the sent uplink data from a corresponding information field based on a second correspondence between different information fields of the downlink control information and different user equipment.

18. The user equipment according to claim 17, wherein the second correspondence is determined based on a radio resource control (RRC) signaling, a media access control-control element (MAC CE), or a physical layer signaling sent by the base station.

19. A base station, comprising a processor and a storage device for storing computer executable instructions that, when executed by the processor, cause the processor to implement the method according to claim 9.

* * * * *